(12) United States Patent
Doi

(10) Patent No.: US 8,301,354 B2
(45) Date of Patent: Oct. 30, 2012

(54) VEHICLE

(75) Inventor: Katsunori Doi, Tokyo (JP)

(73) Assignee: Kabushikikaisha Equos Research (JP)

( * ) Notice: Subject to any disclaimer, the term of this patent is extended or adjusted under 35 U.S.C. 154(b) by 634 days.

(21) Appl. No.: 12/439,143

(22) PCT Filed: Aug. 31, 2007

(86) PCT No.: PCT/JP2007/067002
§ 371 (c)(1),
(2), (4) Date: Sep. 9, 2009

(87) PCT Pub. No.: WO2008/032587
PCT Pub. Date: Mar. 20, 2008

(65) Prior Publication Data
US 2010/0017090 A1 Jan. 21, 2010

(30) Foreign Application Priority Data

Sep. 15, 2006 (JP) .................. 2006-250848

(51) Int. Cl.
*G05B 13/00* (2006.01)
(52) U.S. Cl. .......................... 701/91; 135/65
(58) Field of Classification Search .............. 701/91; 180/210, 211, 213–216, 181, 65.51, 197; 280/226.1, 6.151, 6.159, 124.103, 87.041, 280/87.021, 87.03, 87.051, 87.05; 135/65, 135/67, 69, 74, 75, 84, 85; 5/81.1 R, 83.1, 5/86.1

See application file for complete search history.

(56) References Cited

U.S. PATENT DOCUMENTS

| 4,325,565 A * | 4/1982 | Winchell ............ 280/282 |
| 5,929,334 A * | 7/1999 | Kautzky ............... 73/486 |
| 6,815,919 B2 | 11/2004 | Field et al. ........... 318/587 |
| 2003/0155167 A1 | 8/2003 | Kamen et al. ........ 180/272 |

FOREIGN PATENT DOCUMENTS

| JP | 63-305082 | 12/1988 |
| JP | 2004-129435 | 4/2004 |
| JP | 2004-276727 | 10/2004 |
| JP | 2004-345608 | 12/2004 |

* cited by examiner

Primary Examiner — Dalena Tran
(74) Attorney, Agent, or Firm — Bacon and Thomas, PLLC

(57) ABSTRACT

During vehicle operation, drive wheels are constantly monitored to see whether or not slip of drive wheels occurs and when slip is detected, posture control for slip conditions is performed by uncoupling normal posture control for the drive wheels. A balancer (weight body) which is movable in a longitudinal direction of the vehicle is provided, and posture control is performed by moving the balancer backward when the vehicle inclines forward due to slip and moving the balancer forward when the vehicle inclines backward. The detection of slip is through a comparison between the drive wheels circumferential speed V2 and a vehicle running speed V1.

7 Claims, 6 Drawing Sheets

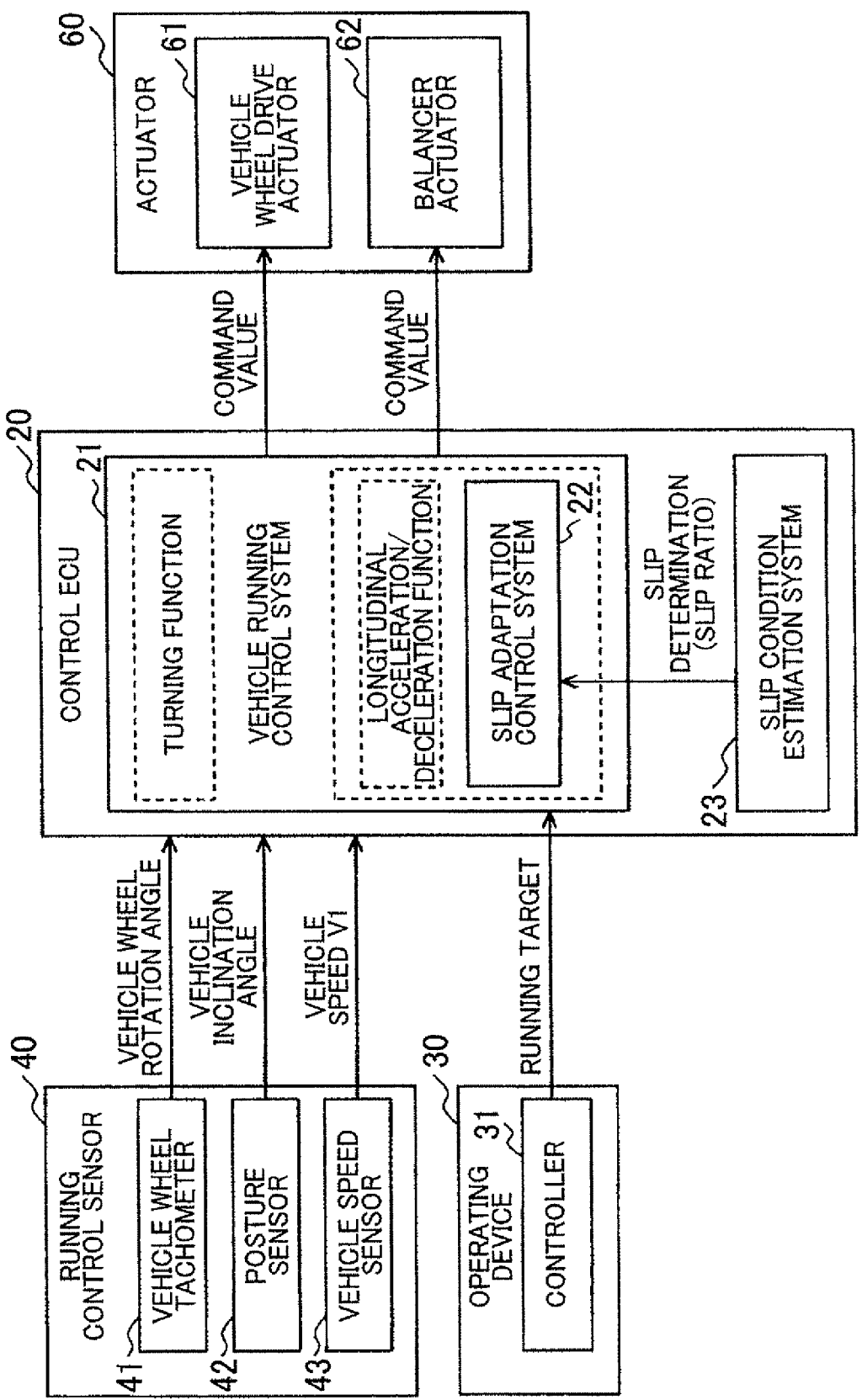

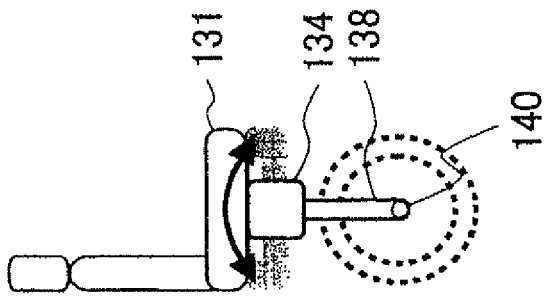
FIG. 3A SLIDE WEIGHT
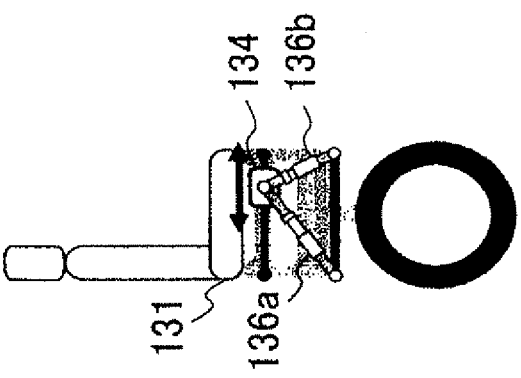
FIG. 3B USE OF ROD ACTUATOR
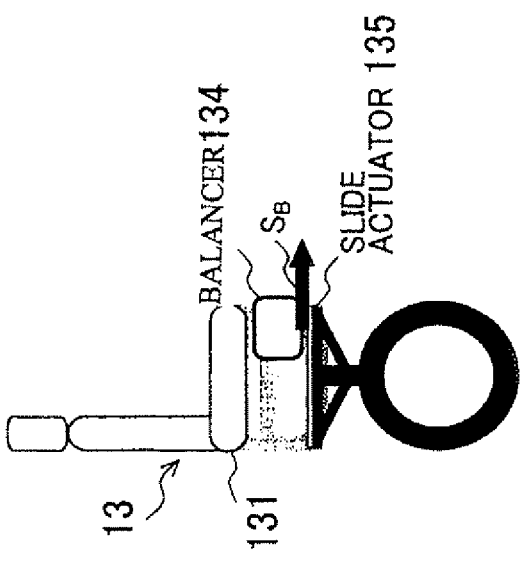
FIG. 3C ROTATION INCLINATION WEIGHT

VEHICLE

TECHNICAL FIELD

The present invention relates to a vehicle, and in particular relates to posture control of, for example, a two horizontally-oriented wheeled vehicle provided with two mutually-opposed drive wheels.

BACKGROUND ART

Vehicles employing an inverted pendulum in posture control (hereafter simply termed "inverted pendulum vehicles") have attracted attention and are currently being put into use.

For example, Patent Document 1 discloses a technique of driving two co-axially disposed drive wheels by using the movement in the center of gravity of a driver to monitor a posture of the drive wheels.

In addition, vehicles which move by controlling the posture of a single related-art circular drive wheel or a single spherical drive wheel and various types of inverted pendulum vehicles have been proposed.

[Patent Document 1] Japanese Patent Application Publication No. JP-A-2004-276727

[Patent Document 2] Japanese Patent Application Publication No. JP-A-2004-129435

In this manner, a vehicle maintains a stationary state or a running state while performing posture control based on a body weight movement amount of a driver, an operation amount from a remote controller or operating device, or preset running command data, for example.

Posture control during running is performed by controlling output torque of the drive wheels so that the vehicle coincides with a target angle of inclination. For example, when an external force causes the vehicle to incline in a forward direction by more than the target angle of inclination, the vehicle posture (inclination angle) is controlled to coincide with a target inclination angle by increasing output torque from the drive wheels and increasing the rotation speed of the drive wheels.

DISCLOSURE OF THE INVENTION

Problem to be Solved by the Invention

For example, when the vehicle inclines in a forward direction by more than the target inclination angle as a result of drive wheel slip during running, normal posture control re-orientates the inclination posture by performing control which increases the rotation of the drive wheels. Since the posture is not re-oriented due to the wheel slip, control to further increase the rotation is required. However, the rotation must actually be decreased to recover from a slip state and thus requires reverse control to normal posture control.

Since posture control under normal conditions is performed based on dynamic structure assuming that the drive wheels do not slip, stable vehicle posture control cannot be performed under slip conditions which have different dynamic structure.

Thus, it is an object of the present invention to provide a vehicle which enables stable posture control under drive-wheel slip conditions.

Means for Solving the Problem (1) According to the invention according to claim 1, the above object is achieved by a vehicle having two mutually-opposed drive wheels, by providing the vehicle with a weight body disposed to be movable with respect to a longitudinal direction of the vehicle, slip determining means determining whether or not the drive wheels have slipped, and posture control means performing posture control by moving the weight body when the slip determining means determines that slip has occurred.

(2) According to the invention according to claim 2, the vehicle according to claim 1 is characterized in that the slip determination means detects a slip ratio of the drive wheels, and when the detected slip ratio exceeds a predetermined threshold value, in addition to posture control by moving the weight body, or in substitution thereof, the posture control means performs posture control by correcting a target vehicle inclination angle.

(3) According to the invention according to claim 3, the vehicle according to claim 1 is characterized in that, in response to a slip condition, the posture control means performs posture control by reduction of a rotation speed of the drive wheels and backward movement of the weight body, or by increase in the rotation speed of the drive wheels and forward movement of the weight body.

Effects of the Invention

According to the present invention, a weight body which is movable with respect to a longitudinal direction of the vehicle is provided and posture control is performed by moving the weight body when drive-wheel slip occurs. Therefore, stable posture control is enabled even under drive-wheel slip conditions.

BEST MODES FOR CARRYING OUT THE INVENTION

Preferred embodiments of a vehicle according to the present invention will be described in further detail making reference to FIGS. 1 to 6.

(1) Overview of the Embodiments

Drive wheels are constantly monitored for slip during vehicle running and when slip is detected, posture control is performed for slip conditions by uncoupling normal posture control for the drive wheels.

In other words, a balancer (weight body) is disposed to be movable in a longitudinal direction of the vehicle and posture control is performed by moving the balancer backward when slip causes the vehicle to incline forward and by moving the balancer forward when slip causes the vehicle to incline backward.

Detection of slip is performed by determining whether or not slip conditions are present based on a comparison of the drive wheels circumferential speed V2 and a vehicle running speed (estimated value for translational motion speed) V1.

Further, a slip ratio is estimated from the difference of the above speeds and when the slip ratio exceeds a predetermined threshold value H, vehicle inclination may be adapted by correcting a target inclination angle $\theta_1{}^*$ so that output torque is reduced. Adaptation of vehicle inclination at this time may be coordinated with posture control by balancer movement or may be performed in substitution for posture control by balancer movement.

Posture control may be performed in response to the slip conditions by reducing the vehicle wheel rotation speed and moving the weight body backward when the vehicle body is inclining forward or by increasing the vehicle wheel rotation speed and moving the weight body forward when the vehicle body is inclining backward.

Decreasing speed during forward inclination and increasing speed during backward inclination facilitate correction of a slip condition.

(2) Detailed Description of the Embodiments

FIG. 1 shows an example of an external appearance of a vehicle according to the present embodiment.

As shown in FIG. 1, the vehicle includes two co-axially disposed drive wheels 11a, 11b.

Both drive wheels 11a, 11b are driven respectively by a drive motor 12.

A mounting section 13 (seat) for mounting an occupant or cargo which are weight bodies is disposed on an upper section of the drive wheels 11a, 11b (hereafter, the drive wheels 11a, 11b will be collectively referred to as drive wheels 11) and the drive motor 12.

The mounting section 13 is formed from a seat surface section 131 on which a driver sits, a back support 132 and a head rest 133.

The mounting section 13 is supported by a support member 14 fixed to a drive motor housing 121 housing the drive motor 12.

An operating device 30 is disposed on the left side of the mounting section 13. The operating device 30 is operated by a driver to perform vehicle commands such as acceleration, deceleration, turning, stationary turning, stopping and braking.

Although the operating device 30 in the present embodiment is fixed to the seat surface section 131, the operating device 30 may be formed by either a hard-wired or wireless remote controller. Furthermore, an armrest may be provided and the operating device 30 may be provided on an upper section thereof.

Although the operating device 30 is provided in a vehicle according to the present embodiment, when the vehicle operates automatically using pre-set running command data, a running command data readout section may be provided in substitution for the operating device 30. The running command data readout section for example may include reading means for reading running command data from various types of memory media such as semiconductor memories and/or transmission control means for reading out running command data from an external section by wireless transmission.

FIG. 1 shows a person mounted on the mounting section 13. However, the vehicle is not limited to those driven by a person and may carry only cargo and run and stop by remote control operation, for example, from an external section, carry only cargo and run and stop according to running command data, or run and stop without carrying anything.

In the present embodiment, although control such as acceleration or deceleration is performed by an operation signal output by operation of the operating device 30, as disclosed in Patent Document 1 for example, posture control and running control of the vehicle in response to an inclination angle may be performed by varying a longitudinal angle of inclination or a forward moment of a driver relative to the vehicle. Furthermore, both methods may be interchanged.

A balancer (weight body) 134 described below (not shown) is disposed between the mounting section 13 and the drive wheels 11. The balancer 134 is movable in a longitudinal direction (a direction orthogonal to the vehicle axis on a horizontal plane) by a balancer actuator 62.

A control unit 16 is disposed between the mounting section 13 and the drive wheels 11.

The control unit 16 in the present embodiment is mounted on a lower face of the seat surface section 131 of the mounting section 13, but may be mounted on the support member 14.

FIG. 2 shows the constitution of the control unit 16.

The control unit 16 includes a control electronic control unit (ECU) 20 for performing various types of control such as running control of a vehicle, posture control, and running control during turning in this embodiment. The operating device 30, a running control sensor 40, a center of gravity position measuring sensor 50, an actuator 60, a battery, and other devices are electrically connected to the control ECU 20.

The battery supplies electrical power to the drive motor 12, the actuator 60, the control ECU 20, and other devices.

The control ECU 20 is constituted by a computer system including a ROM storing data and various programs such as running control programs, posture control programs, and posture control processing programs in this embodiment, a RAM used as an operational section, an external memory device and an interface section.

The control ECU 20 stores, in memory means such as a ROM, known or set values used for calculating a balancer target position $\lambda_B{}^*$ and a target vehicle inclination angle $\theta_1{}^*$, such as balancer mass $m_B$, total vehicle mass M including the occupant, mass $m_1$ of the vehicle inclined section, and the distance $l_1$ between the wheel shaft and the center of gravity of the overall vehicle.

A coefficient of friction/slip-ratio map for determining a coefficient of friction $\mu$ from a slip ratio is also stored in the memory means.

The control ECU 20 includes a vehicle running control system 21 and a slip condition estimation system 23. acceleration/deceleration functions for controlling acceleration/deceleration with respect to a longitudinal vehicle direction and turning functions for turning the vehicle, and includes a slip adaptation control system 22 for performing stable posture control during slip conditions.

During normal conditions when slip does not occur, the vehicle running control system 21 performs posture control based on running targets input with the controller 31 and values for vehicle wheel rotation angle and/or translational acceleration for both drive wheels 11a, 11b supplied from a running control sensor 44.

An output command value is supplied to the vehicle wheel drive actuator 61 to realize longitudinal acceleration/deceleration and turning commands supplied from the operating device 30.

In the present embodiment turning is performed by controlling the rotation speed of both drive wheels 11a, 11b.

The slip adaptation control system 22 calculates a balancer target position $\lambda_B{}^*$ based on a slip determination result supplied from a slip condition estimation system 23 (in a modification taking account of a slip ratio, this may be a slip ratio), and supplies the value to the balancer actuator 62 as a command value.

In a modification of this embodiment, the slip adaptation control system 22 calculates a target vehicle body inclination angle $\theta_1{}^*$ and supplies a corresponding output torque command value to the vehicle drive wheel actuator 61.

The operating device 30 includes a controller 31 and supplies a vehicle running target value to the control ECU 20 based on driver's commands.

The controller 31 includes a joystick. The joystick is in a neutral position when positioned upright, commands forward or back motion by forward or back inclination, and commands turning to the right or left by right or left inclination. The required speed or turning curvature can be increased in response to the angle of inclination.

The running control sensor 40 includes a vehicle wheel tachometer 41 detecting a vehicle wheel rotation angle, an accelerometer 42 detecting translational vehicle acceleration, and a vehicle speed sensor 43 detecting a vehicle running speed.

Detection values from the running control sensor 40 are supplied to the vehicle running control system 21.

The actuator 60 includes a wheel drive actuator 61 driving the drive wheels 11 in response to command values supplied from the vehicle running control system 21.

The wheel drive actuator 61 performs independent control and operation of both drive wheels 11a, 11b in response to the command values.

The actuator 60 also includes a balancer actuator 62 controlling a balancer moving mechanism in accordance with the command values (balancer target position $\lambda_B{}^*$) supplied from the slip condition estimation system 23.

FIG. 3 shows an example of a balancer moving mechanism moving the balancer 134 to a balancer target position $\lambda_B{}^*$.

The balancer moving mechanism functions as weight body moving means displacing the center of gravity of the vehicle by moving the balancer 134 in a longitudinal direction.

The balancer moving mechanism is constituted so that the balancer 134 disposed on a lower section of the seat surface section 131 of the mounting section 13 is moved in a longitudinal direction.

The balancer moving mechanism shown in FIG. 3A of the present embodiment uses a slider actuator 135 to move the balancer 134 in parallel on a slider.

The balancer moving mechanism as shown in FIG. 3B is provided with two expanding/contracting actuators 136a, 136b and moves the balancer 134 in parallel by expanding one of the actuators 136a, 136b and contracting the other.

The balancer moving mechanism as shown in FIG. 3C employs a rotation inclination balancer. This balancer 134 is disposed on an upper end of the support shaft 138 and a rotor of a motor 140 disposed in the center of a drive wheel shaft 139 is fixed to a lower end of a support shaft 138. The balancer 134 is moved by the motor 140 on a circular periphery with the support shaft 138 serving as the radius thereof.

As shown above, the balancer is moved to a desired position by the balancer 134 displaceable with respect to a direction which is orthogonal to the vehicle central axis and the wheel shaft, an actuator applying a drive force to the balancer 134, and a sensor detecting a position of the balancer 134.

Although the balancer 134 in the present embodiment is disposed independently as a weight body, the balancer may be constituted by heavy objects (battery, ECU, etc.) originally mounted on the vehicle, or the balancer may be constituted by a weight body independently of the heavy objects in order to reduce unnecessary weight increase resulting from realizing the present mechanism.

The posture control processing in a vehicle according to the above embodiment will be described hereafter.

FIG. 4 is a flowchart showing posture control processing.

The slip condition estimation system 23 in the control ECU 20 measures a circumferential rotation speed V2 of the drive wheels (step 10).

In other words, the slip condition estimation system 23 measures a rotation speed of the drive wheels 11 from the vehicle wheel rotation angle measured by the vehicle wheel tachometer 41 and determines the circumferential rotation speed from the ground contact radius of the drive wheels.

A preset value for the ground contact radius of the drive wheels is used which is stored in the memory means of the control ECU. However, the preset ground contact radius can be corrected using an internal pressure measurement of the internal pressure of the drive wheels. The ground contact radius may be measured by measuring the distance to the ground surface by using a laser distance sensor disposed on the vehicle or may be estimated by an observer.

Next, the slip condition estimation system 23 estimates the vehicle speed (translational vehicle speed) V1 as a vehicle operating condition by using the vehicle speed sensor 43 (step 20).

A vehicle speed may be calculated as a vehicle operating condition by using an integrated value of measurements of an on-vehicle accelerometer and an angular velocity from an on-vehicle gyro sensor. In this case, an accumulated steady-state deviation due to integration may be corrected by referring to non-slip values (steady-state velocity from an on-vehicle gyro sensor. In this case, an accumulated steady-state deviation due to integration may be corrected by referring to non-slip values (steady-state components).

Alternatively, a relative speed with respect to stationary external objects (such as the road, etc.) may be detected using a current meter, image or laser sensor, for example.

Furthermore, vehicle operation may be estimated using an observer. In other words, a vehicle speed may be estimated from sensor output values and the WM torque during linear acceleration/deceleration, turning and posture control.

The slip condition estimation system 23 calculates a slip ratio from the measured drive wheel circumferential rotation speed V2 and vehicle speed V1 and supplies the value to the slip adaptation control system 22 (step 30).

The slip adaptation control system 22 uses the slip ratio to determine whether or not slip has occurred (step 40).

Even if the measured values V2 and V1 are not perfectly consistent, it is determined that slip has not occurred when the slip ratio is less than a predetermined threshold value taking into account slip ratio during steady-state running and measurement errors.

When it is determined that slip has not occurred (step 40, N), the vehicle running control system 21 performs posture control for normal conditions with respect to the drive wheels (step 50) and returns to the main routine.

In posture control for normal conditions, posture control is performed so that a longitudinal balance is maintained by controlling output torque from the drive wheels to coincide with a target inclination angle in response to the running target value from the controller 30.

The method of performing posture control under normal conditions may be the various control methods disclosed in the specification of U.S. Pat. No. 6,302,230, Japanese Patent Application Publication No. JP-A-63-35082, Japanese Patent Application Publication No. JP-A-2004-129435 and Japanese Patent Application Publication No. JP-A-2004-276727, for example.

When it is determined that slip has occurred (step 40, Y), the slip posture control by moving the balancer and returns to the main routine.

The posture control by movement of the balancer is performed until recovering a non-slip condition (until is it determined that no slip has occurred in step 40 (N)).

FIG. 5 shows slip condition adaptation posture control during slip conditions. Slip conditions include the case in which the drive wheel circumferential speed V2 is greater than the vehicle speed V1 as shown in FIGS. 5A to 5C and the case in which the drive wheel circumferential speed V2 is smaller than the vehicle speed V1 as shown in FIGS. 5D to 5F.

As shown in FIG. 5A, when as a result of a slip, the drive wheel circumferential speed V2>the vehicle speed V1, the vehicle is inclined forward as shown in FIG, 5B because the movement speed of the drive wheels 11 is slower than the speed assumed in the control model.

The slip adaptation control system 22 controls the posture of the vehicle by displacing the position of the overall vehicle center of gravity backward by moving the balancer 134 backward as shown in FIG. 5C.

On the other hand, as shown in FIG. 5D, when the drive wheel circumferential speed V2<the vehicle speed V1, the vehicle inclines backward as shown in FIG. 5E. To correct this posture, the slip adaptation control system 22 controls the vehicle posture by moving the balancer 134 forward as shown in FIG. 5F.

The movement position of the balancer 134 is determined as a balancer target position $\lambda_B{}^*$ using the following formula 1 with the position of the wheel shaft as an origin as shown in FIGS. 5A and D.

In Formula 1, $\tau w$ denotes output torque applied to the drive motor 12, $\mu$ is the coefficient of friction, M is the total vehicle mass including the occupant and the balancer 134, g is gravitational acceleration and $m_B$ is the mass of the balancer.

The coefficient of friction $\mu$ is determined using a frictional coefficient $\mu$/slip-ratio map stored in the ROM based on the slip ratio calculated in step 30. The coefficient of friction $\mu$ may be estimated using an observer. friction $\mu$ may be estimated using an observer.

$$\lambda_B{}^* = (\tau w - \mu M g)/m_B g \quad \text{(Formula 1)}$$

Posture control is performed by supplying the balancer target position $\lambda_B{}^*$ calculated by Formula 1 to the balancer actuator 62 as a command value and moving the balancer 134 to the balancer target position $\lambda_B{}^*$.

As described above, when slip conditions are detected, running operation is continued by performing posture control by moving the balancer 134 rather than posture control for normal conditions.

After recovering from slip conditions by continuing running operation (step 40,N), normal posture control is performed.

Next, a second example of slip condition adaptation posture control will be described.

In the first example above, time is required to recover posture with posture control only using the balancer 134 when the slip ratio is large, that is to say, when the speed difference between V2 and V1 is large.

Therefore, in the second example of slip condition adaptation posture control, when the slip ratio is less than the predetermined threshold value H, posture control (the first example) is performed using the balancer 134. When the slip ratio is equal to or greater than the threshold value H, early recovery of posture is enabled by correcting the target value for the vehicle inclination in addition to the posture control in the first example.

In other words, when the slip ratio calculated in the step 40 is greater than or equal to the threshold value H, the vehicle running control system 21 calculates an after-correction target vehicle inclination angle $\theta_1{}^*$ using Formula 2 below and supplies a command value to the vehicle wheel drive actuator 61 according to the target vehicle inclination angle $\theta_1{}^*$.

$l_1$ in Formula 2 is the distance between the wheel shaft and the overall center of gravity of the vehicle.

$$\theta_1{}^* = (\tau w - \mu M g)/m_B g l_1$$

In a modification of the second example, posture control may be performed by moving the balancer 134 when the slip ratio is less than the threshold value H. When the slip ratio is greater than or equal to the threshold value H, posture control may be performed by correcting the target vehicle inclination angle $\theta_1{}^*$.

Furthermore, although the second example is described with reference to the case in which the slip ratio is greater than or equal to the threshold value H, posture control may be performed through the combination of the balancer 134 and correction of the target vehicle inclination angle $\theta_1{}^*$ without reference to the slip ratio.

Next, a third example of slip condition control adaptation control will be described.

In the third example, in addition to the first and second examples and modifications thereof, active control is performed in order to eliminate slip conditions.

In other words, when a slip condition is detected, the wheel speed is decelerated (during forward inclination) or accelerated (during backward inclination) in the direction which recovers from the slip condition, the balancer 134 is moved and/or the target vehicle inclination angle $\theta_1{}^*$ is corrected in response to the acceleration/deceleration condition.

For example, when forward inclination is caused by slip as shown in FIG. 5B, the slip condition is quickly eliminated by deceleration of drive wheel rotation. At the same time, taking further forward inclination caused by deceleration into account, the balancer 134 is moved backward and/or the target vehicle inclination angle $\theta_1{}^*$ is corrected.

When backward inclination is caused by slip as shown in FIG. 5E, the slip condition is quickly eliminated by accelerating the rotation of the drive wheels and further backward inclination resulting from acceleration is taken into account, then the balancer 134 is moved forward and/or the target vehicle inclination angle $\theta_1{}^*$ is corrected.

As described above, according to the present embodiment, since posture control is performed during slip conditions by moving the balancer 134, stable posture control is enabled.

In the description of the embodiments above and modifications thereto, the total vehicle mass M used in Formulae 1 and 2 is a preset value representing the total mass of the vehicle including the body weight of an occupant within an assumed range. However the total vehicle mass $M(=m_H + m_{CB})$ may be calculated from the mass $m_H$ of the occupant, etc. measured by providing a load measuring device on the seat surface section 131 to measure the load of the occupant/cargo and the known value (design value) for the vehicle mass $m_{CB}$. In this case, the vehicle mass $m_{CB}$ including the mass of the balancer 134 is stored in a storage means such as a ROM.

In this manner, more stable posture control during slip is enabled by obtaining an accurate total vehicle mass as a result of measuring the mass of the occupant/cargo.

The distance $l_1$ from the wheel shaft to the center of gravity of the overall vehicle in Formula 2 may be accurately estimated using the method below.

In other words, in addition to the load measuring device, a sitting height measuring device is disposed in the back support 132 and head rest 133. The sitting height measuring device measures a height of mounted objects (sitting height of occupant) $\zeta_H$ by scanning a moving (scanning) light sensor in a vertical direction (height direction) and thus enables more accurate measurement. A plurality of fixed sensors may be disposed in a vertical direction to measure discrete intervals of the height of the mounted objects $\zeta_H$.

The vehicle running control system 21 determines types of mounted objects (persons, cargo, no object) based on the mounted object mass m measured by the load measuring device and the height of the mounted object $\zeta_H$ (sitting height and height of cargo) from the sitting height measuring device. A height of the center of gravity a mounted object $h_H$ is estimated by the center of gravity position estimation system using a method adapted for the type of object.

The center of gravity position estimation system is provided in the control ECU 20.

FIG. 6 describes the determination of the type of mounted object and the determination of the height of the center of gravity $h_H$ based on the type of object.

As shown in FIG. 6, respective threshold values are set with respect to the sitting determination of the height of the center of gravity $h_H$ based on the type of object.

As shown in FIG. 6, respective threshold values are set with respect to the sitting height $\zeta_H$, the mass $m_H$, and the ratio mass $m_H/\zeta_H$ in order to discriminate between the types of mounted objects. The threshold values used in FIG. 6 and the determination formula below are merely exemplary and may be revised in response to an assumed use environment.

(a) The mounted object is determined to be "no object" when $m_H<0.2$ kg and $\zeta_H<0.01$ m.

(b) The mounted object is determined to be "person" when $m_H>8$ kg and $\zeta_H>0.3$ m and $m_H/\zeta_H>30$ kg/m.

(c) The mounted object is determined to be "cargo" in other cases (cases other than (a) and (b) above).

In the above determination conditions, the setting of the body-weight threshold value in the person determination condition (b) to a small value of 8 kg is premised on the existence of child occupants. The addition of the ratio mass (weight per unit sitting height; $m_H/\zeta_H$) to the person determination condition increases the accuracy of that determination.

An upper limit of $m_H/\zeta_H<p$ (for example, 80 kg/m) may be added to the person determination condition in order to avoid a determination as a person when a small but heavy cargo (for example, a metal objects) is loaded.

Furthermore, the determination condition and the determination values are merely exemplary, and may be suitably varied in response to assumed use conditions to perform determination The center of gravity position estimation system estimates the height of the center of gravity of a mounted object $h_H$ (height from the seat surface section 131) in response to the type of the determined mounted object. In this manner, the mounted object can be determined and the method of estimating the height of the center of gravity $h_H$ can be varied in response to the type of object, which thus enables a more accurate estimated value.

(a) When determining that the mounted object is (no object) $h_H=0$ (b) When determining that the mounted object is "cargo", it is assumed that the center of gravity has deviated below the geometric center. Using a degree of eccentricity γ expressing the degree of downward deviation, the height of the center of gravity $h_H$ is calculated from Formula 3 below. The degree of eccentricity γ is a preset assumed value and has a value of γ=0.4 in the present embodiment.

$$h_H = ((1-\gamma)/2)\zeta_H \quad \text{(Formula 3)}$$

(c) When determining that the mounted object is "person", the height of the center of gravity $h_H$ is calculated from Formula 4 below using a standard human physique as a standard.

In Formula 4, $\zeta_{H,O}$, $h_{H,O}$ are standard values for sitting height and height of center of gravity. In the present embodiment, $\zeta_{H,O}=0.902$ m and $h_{H,O}=0.264$ m.

$$h_H = (\zeta_H/\zeta_{H,O})h_{H,O} \quad \text{(Formula 4)}$$

From the above, when the position of the center of gravity $h_H$ is calculated in response to the type of mounted object, the center of gravity position estimation system calculates a distance $l_1$ from the center of gravity of the overall vehicle to the wheel shaft using Formula 5 below based on the values for the load of the mounted object $m_H$ measured using the load measuring device and the known vehicle mass $m_{CB}$.

In Formula 5, $l_H=h_H+l_0$, and $l_0$ is the distance from the wheel shaft (center of rotation in a longitudinal direction of the vehicle) to the seat surface of the seat surface section 131. $l_{CB}$ represents the distance from the wheel shaft to the vehicle center of gravity (known set value) and M represents the total vehicle mass ($=m_H+m_{CB}$) including the occupant.

$$l_1 = (m_H l_H + m_{CB} l_{CB})/M \quad \text{(Formula 5)}$$

The embodiments above were described using a single-shaft two-wheeled vehicle as an example. However this invention may apply the methods of slip adaptation posture control in these embodiments to vehicles having three wheels or mores

BRIEF DESCRIPTION OF THE DRAWINGS

FIG. 2 shows a constitution of a control unit.

FIG. 3 shows an example of a balancer moving mechanism.

DESCRIPTION OF THE REFERENCE NUMERALS

Figure 1:
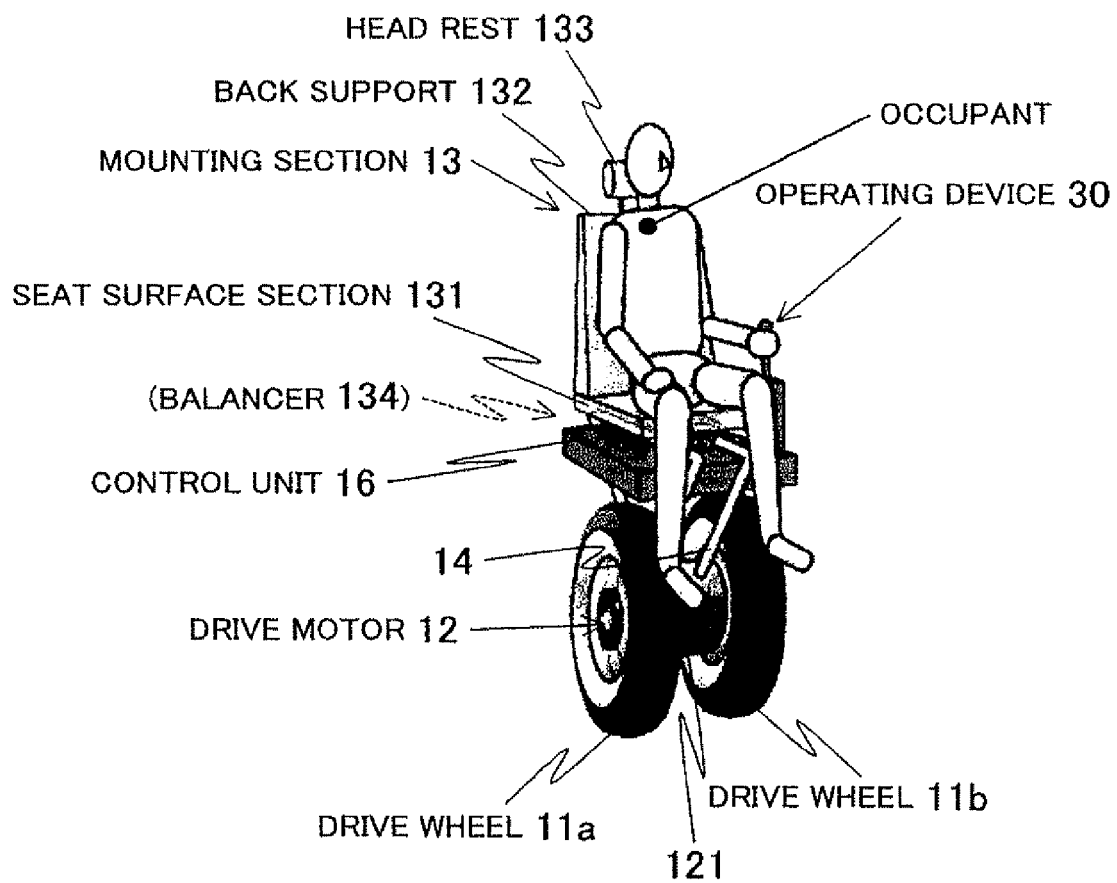
FIG. 1 is an external structural view of a vehicle according to the present embodiment.
Figure 4:
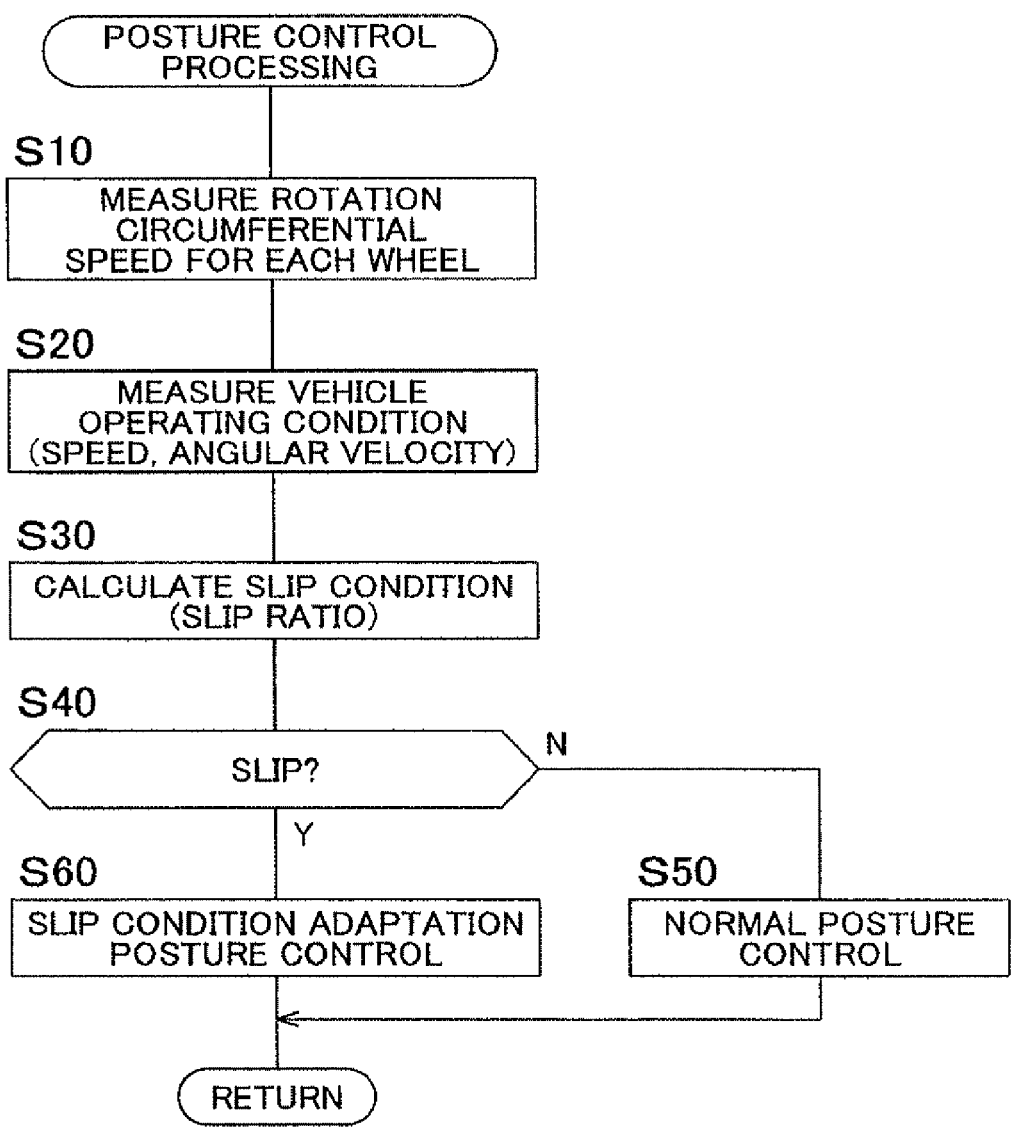
FIG. 4 is a flowchart showing the contents of a posture control processing.
Figures 5A, 5B, 5C:
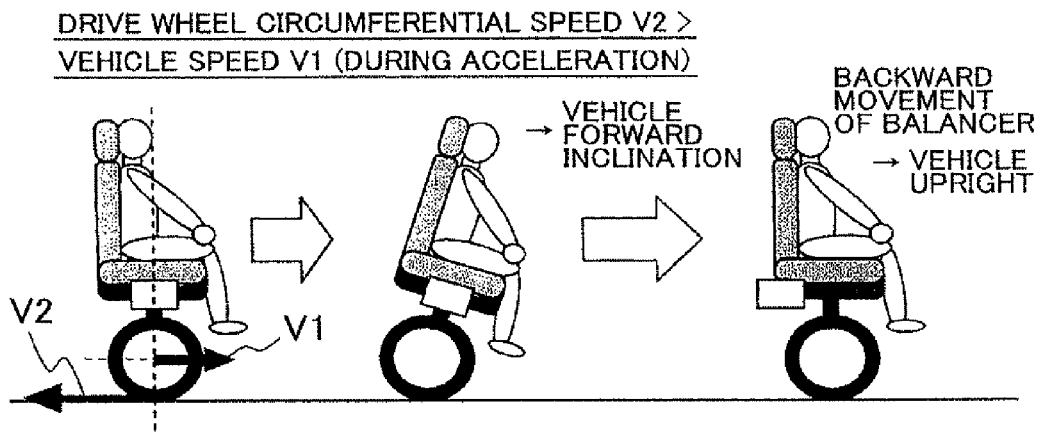
FIG. 5 shows a state of slip condition adaptation posture control.
Figures 5D, 5E, 5F:
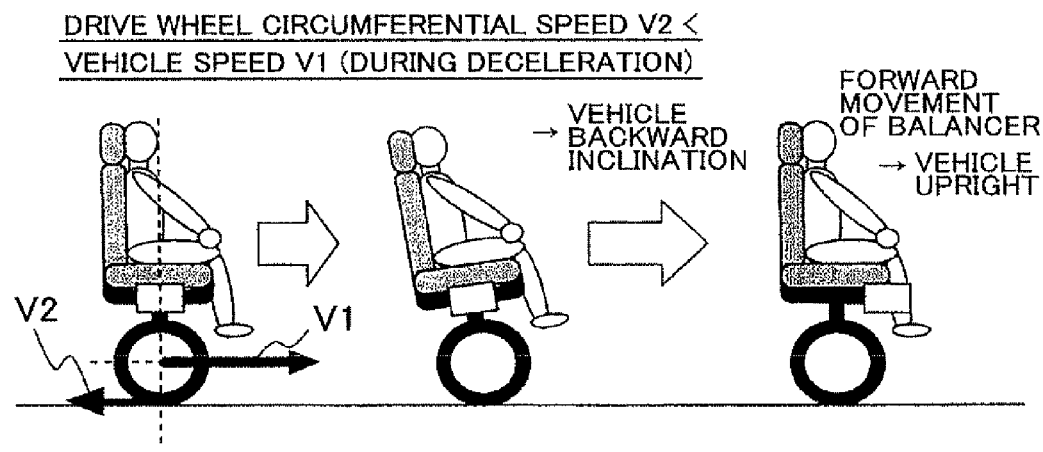
Figure 6:
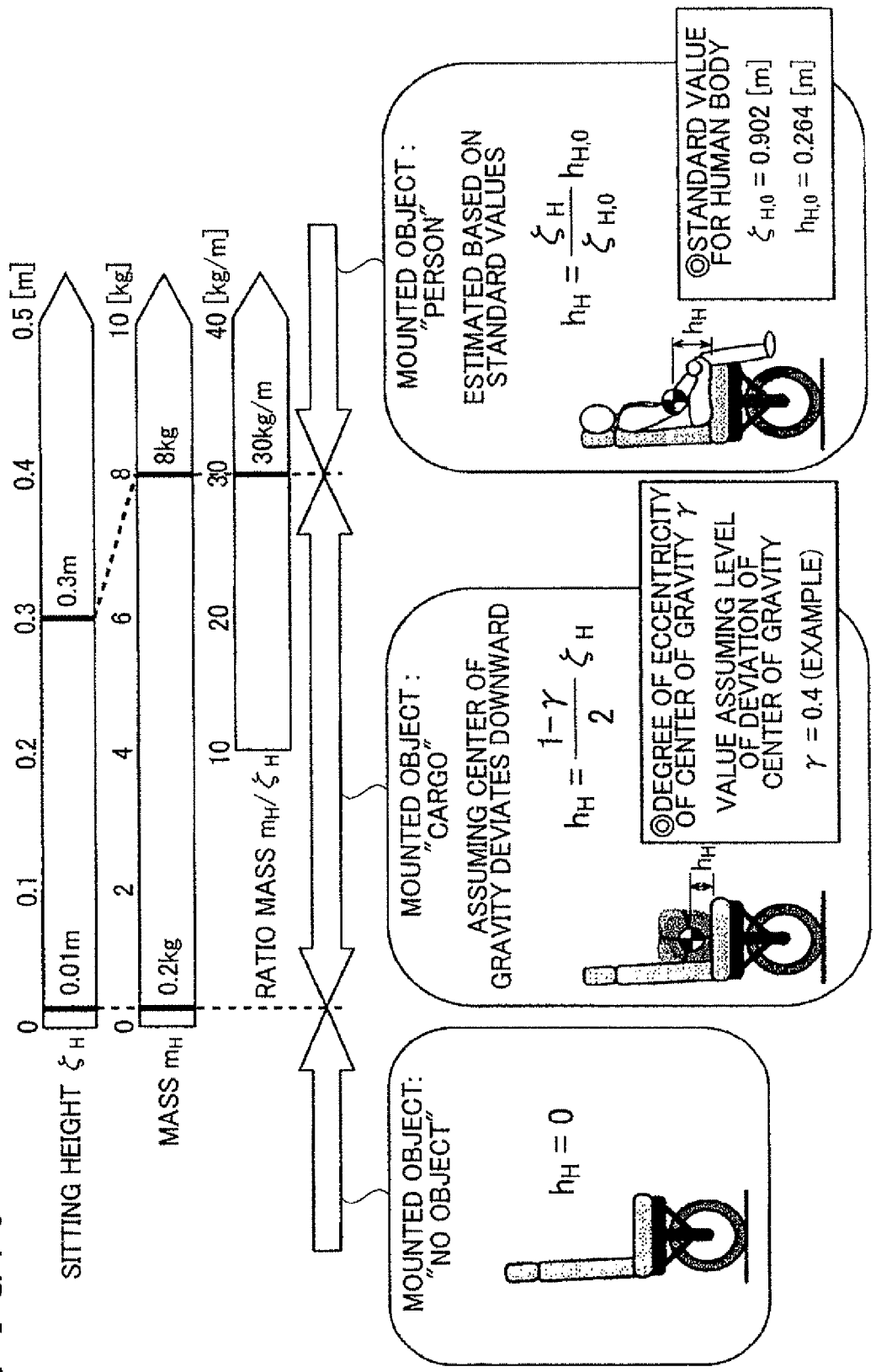
FIG. 6 shows the determination of type of mounted object and the estimation of the height of a center of gravity thereof.

11 DRIVE WHEELS
12 DRIVE MOTOR
13 MOUNTING SECTION
131 SEATING SURFACE SECTION
14 SUPPORTING MEMBER
16 CONTROL UNIT
20 CONTROL ECU
21 VEHICLE RUNNING CONTROL SYSTEM
22 SLIP ADAPTATION CONTROL SYSTEM
23 SLIP CONTROL ESTIMATION SYSTEM
30 OPERATING DEVICE
31 CONTROLLER
40 RUNNING CONTROL SENSOR
41 VEHICLE WHEEL TACHOMETER
42 POSTURE SENSOR
43 VEHICLE SPEED SENSOR
60 ACTUATOR
61 DRIVE WHEEL ACTUATOR
62 BALANCER ACTUATOR

The invention claimed is:

1. A vehicle having two mutually-opposed drive wheels, the vehicle comprising:
   a weight body disposed to be moveable with respect to a longitudinal direction of the vehicle;
   a slip condition estimation system, included within an electronic control unit, which determines whether or not the drive wheels have slipped; and
   a slip adaptation control system, included within the electronic control unit, which provides posture control by moving the weight body responsive to a determination by the slip adaptation control system that slip has occurred.

2. The vehicle according to claim 1, wherein:
the slip condition estimation system detects a slip ratio of the drive wheels, and
when the detected slip ratio exceeds a predetermined threshold value, in addition to posture control by moving the weight body, the slip adaptation control system performs posture control by correcting a target vehicle inclination angle.

3. The vehicle according to claim 1, wherein, responsive to a determination by the slip condition estimation system that slip has occurred, the slip adaptation control system performs posture control by reduction of rotational speed of the drive wheels and rearward movement of the weight body, or by increase of the rotational speed of the drive wheels and forward movement of the weight body.

4. The vehicle according to claim 1, wherein the slip adaptation control system has a first, normal mode of operation wherein longitudinal balance is maintained by controlling output torque to from the drive wheels to coincide with a target inclination angle in response to a running target value from a controller and a second, slip mode wherein the posture control is provided by movement of the weight body until the vehicle recovers a non-slip condition.

5. The vehicle according to claim 4, wherein, in the second mode, the slip adaptation control system, responsive to a determination by the slip condition estimation system that slip has occurred, reduces the vehicle wheel rotational speed and moves the weight body backward when the vehicle body is inclined forward and increases the vehicle wheel rotational speed and moves the weight body forward when the vehicle body is inclined backward.

6. The vehicle according to claim 4 wherein:
the slip condition estimation system detects a slip ratio of the drive wheels, and
when the detected slip ratio exceeds a predetermined threshold value, the slip adaptation control system, operating in the second mode, in addition to posture control by moving the weight body, or in substitution thereof, performs posture control by correcting a target vehicle inclination angle.

7. The vehicle according to claim 4 wherein:
the slip adaptation control system, operating in the second mode, provides posture control by movement of the weight body and by control of wheel rotational speed.

* * * * *